United States Patent
Kim et al.

(10) Patent No.: US 6,219,374 B1
(45) Date of Patent: Apr. 17, 2001

(54) STRUCTURE OF A COHERENT DUAL CHANNEL QPSK TRANSCEIVER USING PILOT SYMBOLS IN A CODE DIVISION MULTIPLE ACCESS SYSTEM

(75) Inventors: Seong Rag Kim; Sugbong Kang; Jeong Goo Lee, all of Daejon-Shi (KR)

(73) Assignee: Electronics and Telecommunications Research Institute, Daejon-Shi (KR)

( * ) Notice: Subject to any disclaimer, the term of this patent is extended or adjusted under 35 U.S.C. 154(b) by 0 days.

(21) Appl. No.: 09/115,072

(22) Filed: Jul. 14, 1998

(30) Foreign Application Priority Data

Nov. 25, 1997 (KR) .................................................. 97-62904

(51) Int. Cl.[7] .............................. H04L 27/30; H04L 5/16; H04L 27/22; H04B 7/216
(52) U.S. Cl. .......................... 375/130; 375/219; 375/329; 370/335
(58) Field of Search .................................... 375/130, 135, 375/136, 139, 219, 316, 320, 329, 295; 370/208, 209, 342, 335, 515

(56) References Cited

U.S. PATENT DOCUMENTS

| | | | |
|---|---|---|---|
| 5,412,351 | * 5/1995 | Nystrom et al. | 332/103 |
| 5,535,247 | * 7/1996 | Gailus et al. | 375/297 |
| 5,623,485 | 4/1997 | Bi | 370/209 |
| 5,712,869 | * 1/1998 | Lee et al. | 375/206 |
| 5,717,713 | * 2/1998 | Natali | 375/200 |
| 5,953,325 | * 9/1999 | Willars | 370/335 |
| 5,960,029 | * 9/1999 | Kim et al. | 375/200 |

* cited by examiner

*Primary Examiner*—Chi Pham
*Assistant Examiner*—Khai Tran
(74) *Attorney, Agent, or Firm*—Cohen, Pontani, Lieberman & Pavane

(57) ABSTRACT

The present invention proposes a structure of a coherent dual-channel QPSK transceiver using pilot symbols in a code division multiple access system, which can reduce the variation width of the entire transmission signal by putting pilot symbols into data bit streams, can remove a crosstalk by separating input information bits into two channels and then allocating different quadrature codes to respective channels, and can also improve the error performance of the entire system by preventing changes in phases of the transmission carrier and reducing the degree of the envelope variation of the entire signals.

2 Claims, 2 Drawing Sheets

STRUCTURE OF A COHERENT DUAL CHANNEL QPSK TRANSCEIVER USING PILOT SYMBOLS IN A CODE DIVISION MULTIPLE ACCESS SYSTEM

FIELD OF THE INVENTION

1. Field of the Invention

The present invention relates to a structure of a coherent dual channel QPSK (Quadrature Phase Shift Keying) transceiver using pilot symbols in a code division multiple access (hereinafter called CDMA) system. In particular, it relates to a structure of a coherent dual channel QPSK transceiver which can greatly reduce crosstalk by adding pilot symbols into a stream of data bits, separating the input information bits into two channels and then allocating different quadrature codes to respective channels.

2. Description of the Prior Art

In a CDMA system, the performance and capacity of the overall system are greatly influenced by noise and interference signals. Therefore, in order to improve the performance of the overall system, it is extremely important to minimize the interference signals. The modulation and demodulation scheme in this CDMA system may be classified into a coherent modulation/demodulation scheme and a noncoherent modulation/demodulation scheme depending on whether required carrier information is required or not upon receipt of the information. When a complete carrier information is provided, the coherent modulation/demodulation scheme has better performance than the noncoherent modulation/demodulation scheme by about 3 dB under additive white Gaussian noise (hereinafter called AWGN). In addition, even in the case of subtractive interference noise suppressor for increasing the capacity of the system, the coherent modulation/demodulation scheme is required because the coherent modulation/demodulation scheme has a channel estimation function which is adapted to variation of radio conditions, for embodying the interference noise suppressor.

The coherent modulation/demodulation schemes in the CDMA system includes the followings.

First, the most simplest BPSK modulation/demodulation scheme has problems that it causes twice inter-chip interference (ICI) compared to QPSK scheme and also it greatly reduces the performance according to non-linear characteristics of the amplifier since the shifts of transmit carrier is rapidly varied by 180° at the moment when data change. In a balanced QPSK scheme, same data bits are input to in-phase and quadrature channels, each of which is spreaded by different spreading sequences. Though this scheme has a similar characteristic to that of dual channel QPSK in that crosstalk between in-phase signals and quadrature signals is reduced, etc., it is inferior to the dual channel QPSK in view of performance. In addition, there is a scheme that the data bits of the scheme are input through separate in-phase and quadrature channels and then spreaded using a same Walsh code and spreading sequence. However, this scheme has problems that it causes crosstalk between the in-phase channel and the quadrature channel when exact carrier information is not received at the receiving terminal and it also reduces the performance according to non-linear characteristics of the amplifier since the shifts of transmit carriers are varied by 180°.

SUMMARY OF THE INVENTION

It is an object of the present invention to solve the problems involved in the prior art, and to provide a structure of a coherent dual channel QPSK transceiver using pilot symbols in a code division multiple access system which can improve gains of the system through coherent modulation/demodulation and can also improve the overall system performance by reducing both crosstalk between in-phase signals and quadrature signals and the degree of variations in envelop of the entire signals.

To achieve the above object, the structure of a coherent dual-channel QPSK transceiver using pilot symbols in a code division multiple access system according to the present invention is characterized in that it comprises a serial-to-parallel converter for separating data bits into an in-phase channel signal and a quadrature channel signal; first and second pilot symbol adders for putting pilot symbols into the signals the channels of which are separated through said serial-to-parallel converters at each given period; first and second mixers for spreading the in-phase channel signals and the quadrature channel signals into which said pilot symbols are periodically added using different Walsh codes; third and fourth mixers for spreading the in-phase channel signals and the quadrature channel signals which are spreaded by said Walsh codes using PN codes; first and second pulse-shaping filters for pulse-shaping the outputs of said third and fourth mixers using them as inputs; fifth and sixth mixers for frequency-modulating said in-phase channel signals and said quadrature channel signals into carriers $\cos(2\pi f_o t + \theta_k)$ and $\sin(2\pi f_o t + \theta_k)$, respectively; and high-power amplifier for amplifying the outputs of said fifth and sixth mixers and then generating transmit signals to an antenna.

To achieve the above object, the structure of a coherent dual-channel QPSK receiver using pilot symbols in a code division multiple access system according to the present invention is characterized in that it comprises first and second mixers for frequency-modulating signals received through channels from a transceiver using carriers $\cos(2\pi f_o t)$ for in-phase channels and $\sin(2\pi f_o t)$ for quadrature channels, respectively; first and second matched filters for filtering said frequency-demodulated in-phase channels and quadrature channel signals; a sampler for multiple-sampling said in-phase and quadrature channels signals which passed through said first and second matched filters; third and fourth mixers for despreading said sampled signals using PN codes of a k-th user; a fifth mixer for combining said in-phase channel signals after said despreading with cosine-terms of channel estimation values of a first amplitude and phase; a sixth mixer for combining said quardrature channel signals after said despreading with sine-terms of channel estimation values of a first amplitude and phase; a first summer for summing the output of said fifth mixer with the output of said sixth mixer to correct channels; a seventh mixer for combining said in-phase channel signals after said despreading with sine-terms of channel estimation values of a second amplitude and phase; an eighth mixer for combining said quadrature channel signals after said despreading with cosine-terms of channel estimation values of a second amplitude and phase; a second summer for summing the output of said seventh mixer with the output of said eighth mixer to correct channels; ninth and tenth mixers for despreading the outputs of said first and second adders, respectively, using Walsh codes; first and second adders for adding signals values using the outputs of said ninth and tenth mixers as inputs during 2N chip periods; and first and second channel estimators for generating cosine-terms of channel estimation values and sine-terms of channel estimation values, respectively, which are used in demodulation channel estimation values, using the in-phase channels and quadrature channel pilot determination signals among the outputs of said first and second adders as inputs, respectively.

BRIEF DESCRIPTION OF THE DRAWINGS

For fuller understanding of the nature and object of the invention, reference should be had to the following detailed description taken in conjunction with the accompanying drawings in which.

Similar reference characters refer to similar parts in the several views of the drawings.

DETAILED DESCRIPTION OF PREFERRED EMBODIMENT

Below, a preferred embodiment of the present invention will be explained in detail with reference to the accompanying drawings.

Figure 1:
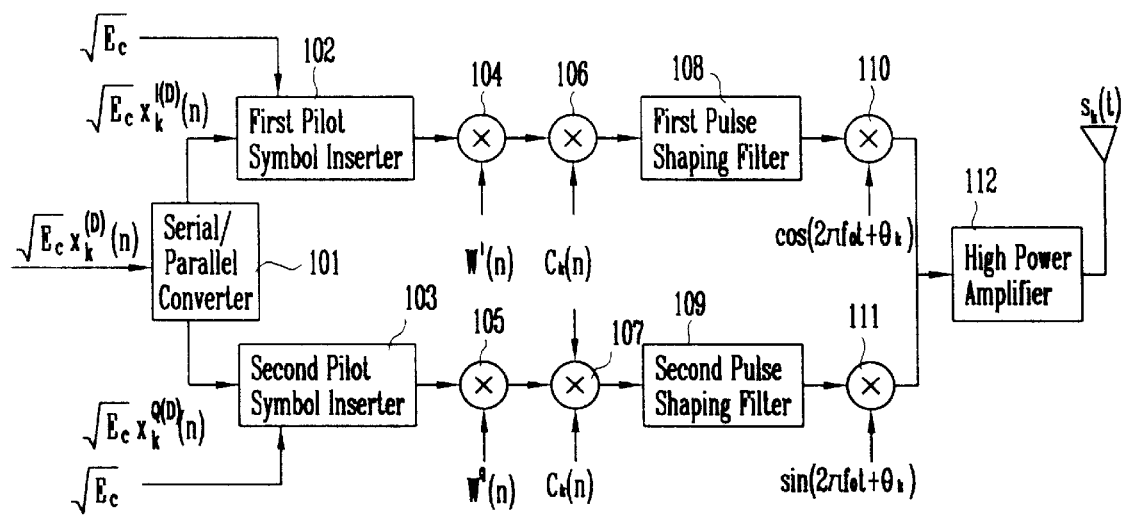
FIG. 1 shows a structure of a coherent dual channel QPSK transceiver in accordance with the present invention.

FIG. 1 shows a structure of a coherent dual channel QPSK transceiver in accordance with the present invention.

First, (+1, −1) signals of communication channel that is $\sqrt{E_c} x^{(D)}_k(n)$ are divided into I channel signal of $\sqrt{E_c} x^{I(D)}_k(n)$ and Q channel signal of $\sqrt{E_c} x^{Q(D)}_k(n)$ by a serial-to-parallel converter 101. Then, respective pilot symbols are periodically added into the I channel signal at the first pilot symbol adder 102 and the Q channel signal at the second pilot symbol adder 103, respectively. The I channel signals into which pilot symbols are periodically added is spreaded by a Walsh code $W^I(n)$ at the first mixer 104 and the Q channel is spreaded by a Walsh code $W^Q(n)$ at the second mixer 105. The I channel signal spreaded by a Walsh code is spreaded by PN code $C_k(n)$ at the third mixer 106 and the Q channel signal is spreaded by PN code $C_k(n)$ at the fourth mixer 107. Then, each of the signals is pulse-shaped through the first pulse shaping filter 108 and the second pulse shaping filter 109 and is then frequency-modulated by a carrier wave $\cos(2\pi f_o t+\theta_k)$ for I channel signal and a carrier wave $\sin(2\pi f_o t+\theta_k)$ for Q channel signal through the fifth and sixth mixers 110 and 111, respectively. Then it is amplified at the high power amplifier 112 and then is transmitted to an antenna.

At this time, a signal $S_k(t)$ which k-th user transmits through the antenna can be expressed into the following [Equation 1]:

$$S_k(t) = \sqrt{E_c} \sum_n W^I(n) x^I_k(n) C_k(n) h(t-nT_c) \cos(2\pi f_0 t + \theta_k) + \sqrt{E_c} \sum_n W^Q(n) x^Q_k(n) C_k(n) h(t-nT_c) \sin(2\pi f_0 t + \theta_k)$$

[Equation 1]

Wherein $\sqrt{E_c}$ indicates a chip energy, $W^I$ and $W^Q$ indicates Walsh codes of I and Q channels, respectively, $x_k(n)$ indicates data bit stream of the k-th user into which pilot symbols are periodically added, $c_k(n)$ indicates PN code of the k-th user, $T_c$ indicates a chip period, $f_0$ indicates a carrier frequency and $\theta_k$ indicates a phase of the k-th user. From the [Equation 1], it can be seen that different data are transmitted to the I channel and Q channels, respectively, and the I channel and Q channels are quadrature-spreaded by different Walsh codes, respectively.

Figure 2:
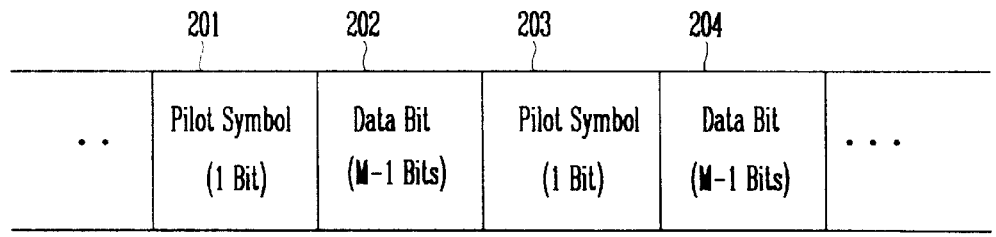
FIG. 2 shows a functional diagram illustrating a communication channel wherein pilot symbols are added into data bits.

FIG. 2 shows a functional diagram illustrating a communication channel wherein pilot symbols are added into data bits.

Pilot symbols 201 and 203 are added by one bit into every data signals 202 and 204 of the communication channel of given bits at a given period.

Figure 3:
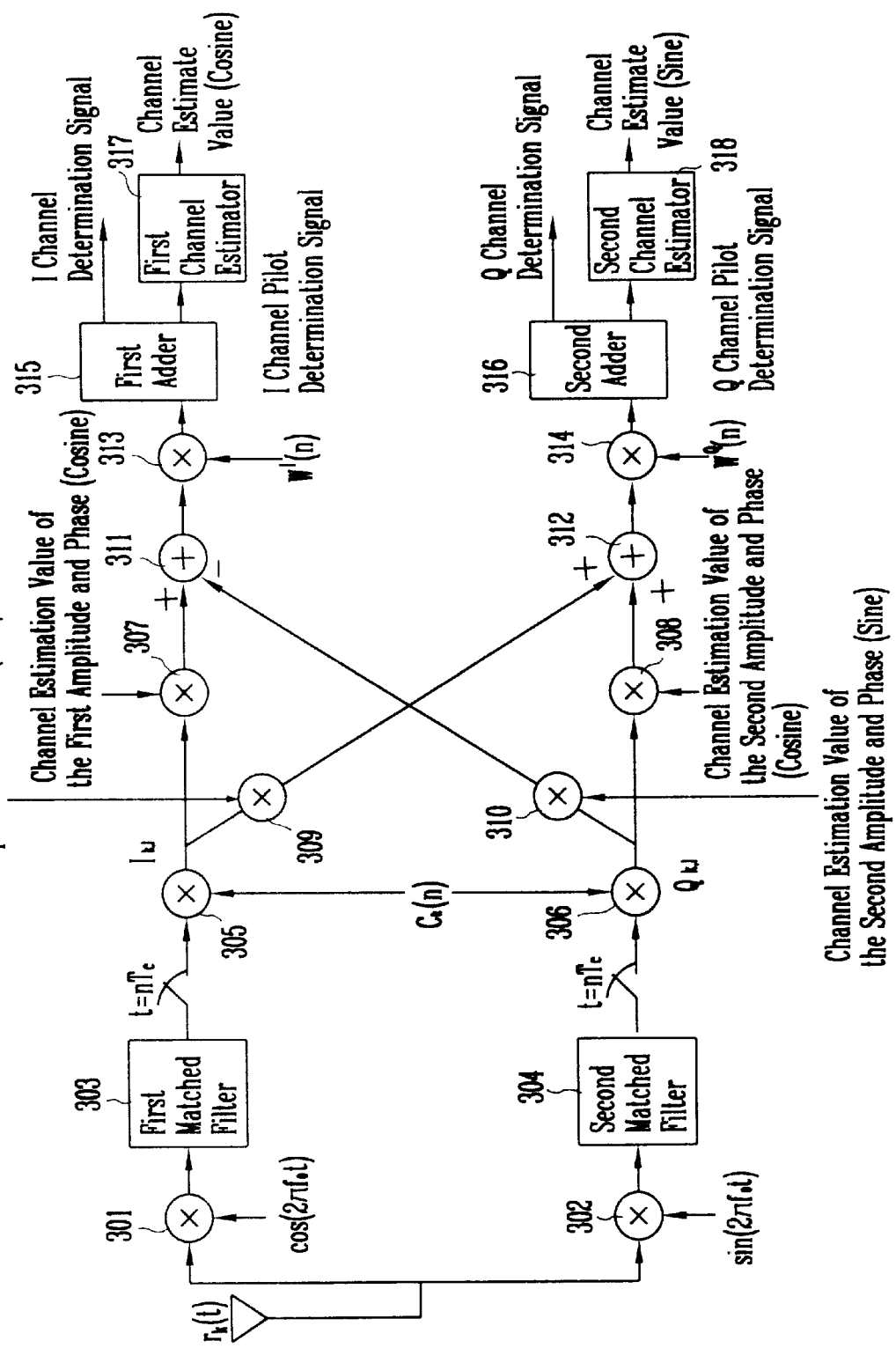
FIG. 3 shows a structure of a coherent dual channel QPSK receiver in accordance with the present invention.

FIG. 3 shows a structure of a coherent dual channel QPSK receiver in accordance with the present invention, which illustrates a process of estimating channels using the pilot symbols added thereto at a given period and of demodulating data using them.

Signals $r_k(t)$ received through the channel from the transceiver are frequency-demodulated at the mixers 301 and 302 by means of carrier waves $\cos(2\pi f_o t)$ for the I channel and carrier waves $\sin(2\pi f_o t)$ for the Q channel, and are sampled by a multiple of the positive number of the chip period $T_c$ through the first and second matched filters 303 and 304. Then, they are despreaded at the mixers 305 and 306 using the PN code $C_k(n)$ of the k-th user, thereby producing I channel signals $I_{k,I}$ and Q channel signals $Q_{k,I}$ after the despreading process.

Thereafter, the I channel signals $I_{k,I}$ after the despreading process are combined at a cosine-term mixer 307 for the channel estimation value of the first amplitude and phase after the despreading process, and are then added at the adder 311 with the value produced by combining the Q channel signal $Q_{k,I}$ after the despreading process with the sine-term for the channel estimation value of the second amplitude and the phase at the mixer 310, thereby correcting the channel. Meanwhile, the Q channel signal $Q_{k,I}$ after the despreading process are combined at a cosine-term mixer 308 with the channel estimation value of the second amplitude and phase and are then added at the adder 312 with the value produced by combining the I channel signal $I_{k,I}$ after the despreading process with the sine-term for the channel estimation value of the first amplitude and the phase at the mixer 309, thereby correcting the channel. At this time, the cosine-term of the channel estimation value for the first and second amplitudes and phases has the values of $\hat{\alpha} \cos \hat{\phi}_{k,i}$ in case of data and the I channel thereof has +1 and the Q channel thereof has −1 in case of the pilot signals. Also, the sine-term of the channel estimation value of the first and second amplitudes and phases has the value of $\hat{\alpha} \cos \hat{\phi}_{k,i}$ in case of data and the I channel thereof has +1 and the Q channel thereof has −1 in case of the pilot signals.

Thereafter, the signals are despreaded using each of Walsh codes $W^I(n)$ and $W^Q(n)$ at the mixers 313 and 314, respectively, and are each inputted to the first and second adders 315 and 316 which sum the signal values during the 2N chip period. Each of the first and second adders 315 and 316 output I channel determination signal of $Z^{I(D)}_{k,i}$ and Q channel determination signal of $Z^{Q(D)}_{k,i}$ and I channel pilot determination signal of $Z^{I(P)}_{k,i}$ and Q channel pilot determination signal of $Z^{Q(P)}_{k,i}$ respectively, for the k-th user.

Thereafter, the I channel and Q channel pilot determination signals are each channel-estimated at the first and second channel estimator 317 and 318, which become respective sine-terms of cosine-term channel estimation values of channel estimation value used in the channel estimation values upon data demodulation.

Next, these procedures will be in detail explained using a mathematical equation. Signals transmitted by a plurality of users including the k-th user and signals $r_k(t)$ received at the antenna reflecting a channel noise can be expressed into the following [Equation 2]:

$$r_k(t) = \sqrt{E_c} \sum_n W^I(n) x_k^I(n) C_k(n)$$ [Equation 2]

$$\sum_{l=1}^{L} \alpha_{k,1}(n) h(t - nT_c - \tau_{k,1}(t)) \cos(2\pi f_0 + \phi_{k,1}(t)) +$$

$$\sqrt{E_c} \sum_n W^Q(n) x_k^Q(n) C_k(n)$$

$$\sum_{l=1}^{L} \alpha_{k,1}(n) h(t - nT_c - \tau_{k,1}(t)) \sin(2\pi f_0 + \phi_{k,1}(t)) +$$

$$\sum_{j=1, j \neq k}^{K} \sqrt{E_c} \sum_n W^I(n) x_j^I(n) C_j(n)$$

$$\sum_{l=1}^{L} \alpha_{j,1}(n) h(t - nT_c - \tau_{j,1}(t)) \cos(2\pi f_0 + \phi_{j,1}(t)) +$$

$$\sum_{j=1, j \neq k}^{K} \sqrt{E_c} \sum_n W^Q(n) x_j^Q(n) C_j(n) \sum_{l=1}^{L} \alpha_{j,1}(n)$$

$$h(t - nT_c - \tau_{j,1}(t)) \sin(2\pi f_0 + \phi_{j,1}(t)) + n(t)$$

Wherein K represents number of users in service, $\alpha_{k,l}(n)$, $\phi_{k,l}(t)$ and $\tau_{k,l}(t)$ represent the amplitude, phase and time delay of the channel response for the l-th path signal of the k-th user, respectively. Also, n(t) represents AWGN. The received I and Q channel signals are PN-despreaded at the mixers 305 and 306 can be expressed into the following [Equation 3]:

$$I_{k,l}(n) = \frac{1}{2} \sqrt{E_c} \alpha_{k,l}(n)(W^I(n) x_k^I(n) \cos \phi_{k,l}(n) +$$ [Equation 3]

$$(W^Q(n) x_k^Q(n) \sin \phi_{k,l}(n)) + v_{k,l}^I(n)$$

$$Q_{k,l}(n) = \frac{1}{2} \sqrt{E_c} \alpha_{k,l}(n)(W^Q(n) x_k^Q(n) \cos \phi_{k,l}(n) -$$

$$(W^I(n) x_k^I(n) \sin \phi_{k,l}(n)) + v_{k,l}^Q(n)$$

Wherein $v_{k,l}(n)$ represents a noise including a white Gaussian noise and a multiple access noise.

The obtained I and Q channel determination signals of the k-th user, obtained by despreading by means of the Walsh codes $W^I$ and $W^Q$ at the mixers 313 and 314 and then adding together at the first and second adders 315 and 316 during 2N chip period, can be expressed into the following [Equation 4]:

$$Z_{k,l}^{I(D)} = \sum_n^{2N} (^\wedge \alpha_{k,l} I_{k,l}^{(D)}(n) W^I(n) \cos^\wedge \phi_{k,l} -$$ [Equation 4]

$$^\wedge \alpha_{k,l} Q_{k,l}^{(D)}(n) W^I(n) \sin^\wedge \phi_{k,l}$$

$$= N^\wedge \alpha_{k,l} \alpha_{k,l} \sqrt{E_c} \, x_k^I(n) \cos(\phi_{k,l} - ^\wedge \phi_{k,l}) +$$

$$v_{z,k,l}^{I(D)}(n)$$

$$Z_{k,l}^{Q(D)} = N^\wedge \alpha_{k,l} \alpha_{k,l} \sqrt{E_c} \, x_k^Q(n) \cos(\phi_{k,l} - ^\wedge \phi_{k,l}) + v_{z,k,l}^{Q(D)}(n)$$

To the contrary, in case of the conventional QPSK modulation/demodulation scheme, the I and Q channel determination signals of the k-th user can be expressed into the following [Equation 5]:

$$Z_{k,l}^{I(D)} = N^\wedge \alpha_{k,l} \alpha_{k,l} \sqrt{E_c} \, [x_k^{I(D)} \cos(\phi_{k,l} - ^\wedge \phi_{k,l}) +$$ [Equation 5]

$$x_k^{Q(D)} \sin(\phi_{k,l} - ^\wedge \phi_{k,l})] + v_z^{I(D)}$$

$$Z_{k,l}^{Q(D)} = N^\wedge \alpha_{k,l} \alpha_{k,l} \sqrt{E_c} \, [x_k^{Q(D)} \cos(\phi_{k,l} - ^\wedge \phi_{k,l}) -$$

$$x_k^{I(D)} \sin(\phi_{k,l} - ^\wedge \phi_{k,l})] + v_z^{Q(D)}$$

From the above Equation, in case of the conventional QPSK scheme, it can be understood that there remained Q channel data within the I channel determination signal equation and I channel data within the Q channel determination signal equation. These components show crosstalks, which can be removed by quadrature-spreading the I and Q channels by means of the present invention, thereby greatly improving the error performance of the overall system.

Meanwhile, the obtained I and Q channel determination signals of the k-th user, obtained by despreading by means of the Walsh codes $W^I$ and $W^Q$ at the mixers 313 and 314 and then adding at the first and second adders 315 and 316 during 2N chip period, can be expressed into the following [Equation 6]:

$$Z_{k,l}^{I(P)} = \sum_n^{2N} (I_{k,l}^{(P)}(n) W^I(n) + Q_{k,l}^{(P)}(n) W^I(n))$$ [Equation 6]

$$= 2N \sqrt{E_c} \,^\wedge \alpha_{k,l} \cos^\wedge \phi_{k,l} + v_{z,k,l}^{I(P)}(n)$$

$$Z_{k,l}^{Q(P)} = \sum_n^{2N} (I_{k,l}^{(P)}(n) W^Q(n) + Q_{k,l}^{(P)}(n) W^Q(n))$$

$$= 2N \sqrt{E_c} \,^\wedge \alpha_{k,l} \sin^\wedge \phi_{k,l} + v_{z,k,l}^{Q(P)}(n)$$

Each channel parameters are estimated through the first and second channel estimators 317 and 318 by means of a procedure of adding these pilot determination signals during $N_p$ bit period and then they can be expressed into the following [Equation 7]. Wherein the $N_p NT_c$ time sets $N_p$ so as to become within the time in which the channel characteristic is maintained constant.

$$^\wedge \alpha_{k,l} \cos^\wedge \phi_{k,l} = \frac{1}{2NN_p \sqrt{E_c}} \sum_i^{N_p} Z_{k,l}^{I(p)}(i)$$ [Equation 7]

$$^\wedge \alpha_{k,l} \sin^\wedge \phi_{k,l} = \frac{1}{2NN_p \sqrt{E_c}} \sum_i^{N_p} Z_{k,l}^{Q(p)}(i)$$

As described above, the present invention estimates channels using pilot symbols. Though in case of using the conventional pilot channels the width in changes of the entire transmission signal magnitude is great because pilot channels exist as separate pilot channels, the pilot symbols do not exist as separate channels in the present invention and exist as data bit streams, thereby reducing the width in changes of the entire transmission signal magnitude.

From the foregoing, the present invention provides the advantages in that it can reduce the width of the entire transmission signal magnitude by putting pilot symbols into data bit streams, can remove a crosstalk by separating input information bits into two channels and then allocating different quadrature codes to respective channels, and can also improve the error performance of the entire system by preventing changes in phases of the transmission carrier and reducing the degree of the envelope variation of the entire signals.

The foregoing description, although described in its preferred embodiment with a certain degree of particularity, is only illustrative of the principles of the present invention. It is to be understood that the present invention is not to be limited to the preferred embodiments disclosed and illustrated herein. Accordingly, all expedient variations that may be made within the scope and the spirit of the present invention are to be encompassed as further embodiments of the present invention.

What is claimed is:

1. A coherent dual-channel Quadrature Phase Shift Keying (QPSK) transceiver device using pilot symbols in a code division multiple access system, comprising:
    a serial-to-parallel converter for dividing a communication signal which comprises data bits into an in-phase channel signal and a quadrature channel signal;
    a first pilot symbol adder for periodically inserting pilot symbols into said in-phase channel signal;
    a second pilot symbol adder for periodically inserting said pilot symbols into said quadrature channel signals;
    first and second mixers for spreading said in-phase channel signals and said quadrature channel signals into which said pilot symbols are periodically inserted using different Walsh codes;
    third and fourth mixers for spreading said in-phase channel signals and said quadrature channel signals which have been spread by said different Walsh codes using different PN codes;
    first and second pulse-shaping filters for pulse-shaping outputs of said third and fourth mixers, respectively;
    fifth and sixth mixers for frequency-modulating said pulse-shaped in-phase channel signals and quadrature channel signals into carriers $\cos(2\pi f_0 t+\theta_k)$ and $\sin(2\pi f_0 t+\theta k)$, respectively; and
    a high-power amplifier for amplifying outputs of said fifth and sixth mixers and transmitting resulting transmit signals to an antenna.

2. A coherent dual-channel Quadrature Phase Shift Keying (QPSK) receiver device using pilot symbols in a code division multiple access system, comprising:
    first and second mixers for frequency-modulating signals received through in-phase channel and quadrature channel from a transceiver using carrier wave $\cos(2\pi f_0 t)$ for said in-phase channel and carrier wave $\sin(2\pi f_0)$ for said quadrature channel;
    first and second matched filters for filtering said frequency-demodulated in-phase channel signals and quadrature channel signals;
    a sampler for sampling by a positive number of a chip period said in-phase and quadrature channel signals which passed through said first and second matched filters;
    third and fourth mixers for despreading said sampled signals using PN codes of a k-th user and producing despreaded in-phase channel signals and despreaded quadrature channel signals, respectively;
    a fifth mixer for combining said despreaded in-phase channel signal with cosine-terms for producing channel estimation values of a first amplitude and phase;
    a sixth mixer for combining said despreaded quadrature channel signal with sine-terms for producing channel estimation values of a second amplitude and phase;
    a first summer for summing the output of said fifth mixer with the output of said sixth mixer to correct said in-phase channel signal;
    a seventh mixer for combining said in-phase channel signal after said despreading with sine-terms for producing said channel estimation values of said first amplitude and phase;
    an eighth mixer for combining said quadrature channel signals after said despreading with cosine-terms for producing said channel estimation values of said second amplitude and phase;
    a second summer for summing the output of said seventh mixer with the output of said eighth mixer to correct said quadrature channel signal;
    ninth and tenth mixers for despreading the outputs of said first and second summers, respectively, using different Walsh codes;
    first and second adders for adding signal values using the outputs of said ninth and tenth mixers as inputs during 2N chip periods, said first adder outputting an in-phase channel determination signal and an in-phase channel pilot determination signal and said second adder outputting a quadrature channel determination signal and a quadrature channel pilot determination signal; and
    first and second channel estimators for generating cosine-terms of channel estimation values and sine-terms of channel estimation values, respectively, which are used in demodulation channel estimation values, using said in-phase channels and quadrature channel pilot determination signals as inputs, respectively.

* * * * *